W. A. BONNELL.
OUTLET BOX FOR ELECTRIC CONDUITS.
APPLICATION FILED AUG. 1, 1908.
921,584.
Patented May 11, 1909.
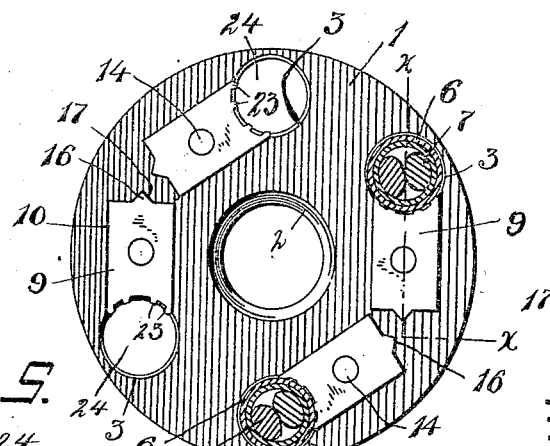
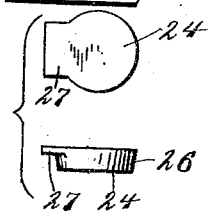
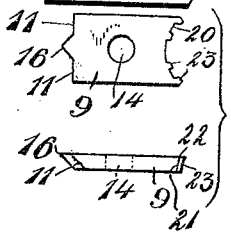
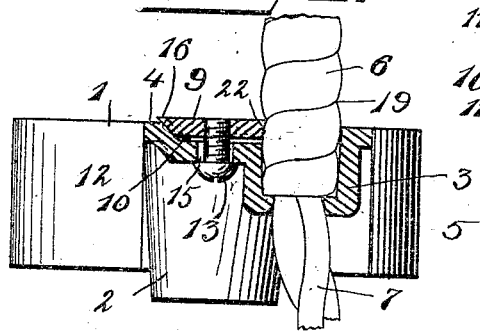
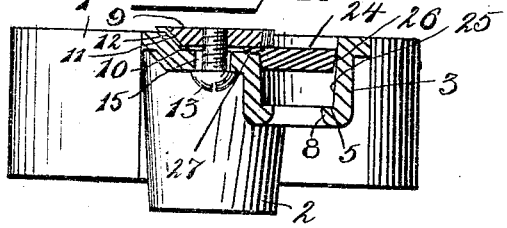
Witnesses:
Inventor
W. A. BONNELL
By his Attorneys

UNITED STATES PATENT OFFICE.

WILLIAM A. BONNELL, OF NEW YORK, N. Y., ASSIGNOR TO HATTIE W. BONNELL, OF BROOKLYN, NEW YORK.

OUTLET-BOX FOR ELECTRIC CONDUITS.

No. 921,584. Specification of Letters Patent. Patented May 11, 1909.

Application filed August 1, 1908. Serial No. 446,474.

*To all whom it may concern:*

Be it known that I, WILLIAM A. BONNELL, a citizen of the United States, residing in the city, county, and State of New York, have invented certain new and useful Improvements in Outlet-Boxes for Electric Conduits, of which the following is a full, clear, and exact description.

My invention relates to improvements in outlet boxes for electric conduits, and has for its object the provision of simple and effective means for holding the conduits in position in the box in such manner that the greatest clamping effect may be secured without danger of abrading the insulation on the conduits.

A further object is to provide means for holding so-called knock-out disks in position in the conduit receiving sockets or apertures in the box when the same are not in use.

With these and other objects in view, the invention consists in the construction and arrangement of parts illustrated in the accompanying drawing, in which—

Figure 1 is a plan view of a ceiling outlet box looking at the top when in position. Fig. 2 is a sectional view through one of the conduit sockets, showing a conduit clamped in position. Fig. 3 is a view similar to Fig. 2, showing a knock-out disk held in place in a conduit socket by the clamping means. Fig. 4 comprises plan and edge views of my improved clamping plate. Fig. 5 comprises plan and edge views of the knock-out disk.

In the embodiment of my invention herein selected for illustration, I have chosen to show my improved clamping means in connection with a ceiling outlet box, although it is obvious that the same means may be employed in connection with wall or other junction boxes for electrical conduits. In the form here shown, the box consists of a cylindrical body portion 1, which is provided at its center with a lead 2 for a gas pipe, to which the box may be secured in any suitable manner, as by clamping screws (not shown). Around the perimeter of the base of the box are arranged a plurality of conduit bushings 3, which may be cast integral with the base 4 of the box, as shown. Each of these bushings is provided at its lower extremity with a flange 5 forming a shoulder upon which the end of the insulation 6 of the conduit rests, while the electric cables 7 project through the opening in the bushing. The bushing, furthermore, is provided with a beveled edge 8 to permit free movement of the electric cables therein without danger of abrading the insulation thereon.

In securing the conduits within the box, it is of the utmost importance that they be so securely held that there will be no danger of their slipping out of position, while at the same time it is essential that the means for clamping the conduit in position shall not abrade or in any manner injure the conduit insulation. To this end I provide a means for holding and clamping the conduits in position in the bushings 3 by means of clamping plates 9, which are located in similar shaped depressions 10 located at the exterior of the rear or base plate 4 of the box. Each clamping plate, as illustrated in Fig. 4, is provided with a cam or beveled rear face 11, which coöperates with the beveled rear face 12 of depression 10 to force the clamping plate forward against the conduit when the plate is drawn to clamping position by means of a screw 13. The clamping plate is provided with a screw-threaded aperture 14 to receive said screw, and the bottom of the plate-receiving depression 10 is slotted, as at 15, to permit the forward and backward clamping and release movements of said clamping plate. In order that the clamping plate may slide with the least possible friction upon the rear beveled surface 12 of the plate-receiving depression 10 and for guidance of said plate, I provide at the rear end of the plate an angular rib 16 which slides in a corresponding groove 17 formed in the inclined wall 12 of the depression 10. The portions of the rear end 11 of the clamping plate upon either side of the rib 16 are so formed as not to bear heavily on the corresponding beveled surfaces of the wall 12 of the plate-receiving depression. By this means the clamping plate 9 moves easily to clamping position, without undue friction between its beveled wall and the beveled wall of the plate-receiving depression.

The form of conduits commonly used consists, as here shown, of a spirally wound covering strip of soft metal, the strip forming the covering being more or less convexed on the outside, thus forming a spiral groove 19 on the outside of the completed conduit. Advantage is taken of this structure to effect a more secure clamping hold upon the conduit by the clamping plate. To this end the clamping plate is curved at 20, Fig. 4, at its forward or clamping end to fit around the conduit, and this curved face is somewhat undercut or beveled, as at 21, whereby the upper edge 22 of the clamping face will take at some point within the spiral groove 19 of the conduit, as shown in Fig. 2, and will the more securely hold the conduit against being pulled out of its bushing or displaced. The clamping face 21 of the plate 9 is furthermore provided with holding ridges or teeth 23, Fig. 4, to more securely engage the conduit and prevent rotation thereof in its receiving bushing.

Referring now to Figs. 3 and 5, it will be seen that the construction and arrangement of clamping plate here illustrated affords means for holding a so-called knock-out disk 24 in such of the conduit receiving bushings 3 as are not in use. The inner walls of said bushings are somewhat tapered, as shown at 25, Fig. 3, and the knock-out disks are provided with beveled perimeters 26, which permit said disks to be inserted for a short distance within the bushings to a depth substantially flush with the bottom of the clamping plate-receiving depression 10. When in such position, the clamping plate when screwed home will project over the edge of the disk and serve to hold it in place. While the tapering of the inner wall of the bushing and the beveling of the perimeters of the disks is sufficient under ordinary conditions to hold the disks in proper position within the sockets, I provide additional means on the disk to be engaged by the clamping plate, in the form of a lug 27, which may rest upon the bottom of the clamping plate depression 10, and which is engaged by the clamping plate.

When the outlet box is in position and it is desired to insert one or more conduits therein, the knock-out disks 24 may be knocked out of position by means of a screw-driver or other instrument, by a sharp blow thereon from the under side, the projection of the clamping plate over said disk being insufficient to prevent this operation, and the lug 27 upon the disk (when said lug is provided) is of such thickness as to be easily broken by the knock out blow upon the disk. The clamping plate screw 13 is then loosened, thus permitting the clamping plate to be moved back from its projection over the bushing, the conduit is inserted, and the clamping plate again screwed home until its forward or clamping edge firmly engages the same.

By the above construction it will be noticed that the interior of the outlet box is left substantially entirely free for the manipulation and positioning of the electric cables, inasmuch as the clamping plates are located upon the upper or exterior surface of the base, and the conduit receiving bushings 3 project but a comparatively short distance within the box. The advantage derived from this open or unobstructed construction of the interior of the box will be appreciated by those skilled in the art.

A further and very important advantage of arranging the clamping plates upon the rear of the base of the box is secured for the following reasons. The electricians, in cutting and fitting the conduits, rarely cut them off square but almost invariably cut them on an angle, and furthermore unless unusual care is exercised an uneven jagged end is left on the conduit. It is essential therefore to the secure holding of the conduit in the box that it be clamped or gripped not immediately at the end but at a considerable distance therefrom. By locating the clamping plates upon the rear of the base, it is possible to grip the conduits at the greatest distance from their ends consistent with practical arrangement of the clamping means.

While I have here illustrated and described a particular construction and arrangement of outlet box, it is obvious that the same may be varied in detail without departing from the spirit and scope of my invention.

What I claim is:

1. An outlet box having a plurality of conduit receiving bushings, depressions in the exterior of the rear of said box adjacent said bushings, clamping plates arranged in said depressions, said plates and depressions having coöperating cam faces at their rear ends, there being slots in the bases of said depressions and clamping screws extending through said slots and engaging said plates and operable from the inside of said box to move said plates to clamping position.

2. An outlet box having one or more conduit receiving bushings fixed to its base and conduit clamping means arranged at the rear of the base of said box, constructed and arranged to engage the conduits at points distant from the ends of said conduits.

3. An outlet box having one or more stationary conduit receiving bushings fixed to its base and conduit clamping plates located at the rear of the base and constructed and arranged to engage the conduits at points substantially in the plane of the base.

4. An outlet box having one or more stationary conduit receiving bushings projecting into said box and clamping means on said box constructed and arranged to engage the conduits substantially at the base of said bushings.

5. An outlet box having one or more conduit receiving bushings projecting into said box, and clamping plates arranged on said box and having clamping edges arranged to engage the conduits substantially at the base of said bushings.

6. An outlet box having one or more conduit receiving bushings formed integral with the base and extending into the interior of the box and clamping plates arranged at the rear of the base adjacent the entrance to each bushing and constructed and arranged to engage a conduit substantially in the plane of the base of the box.

7. An outlet box having one or more conduit receiving sockets, clamping plates arranged adjacent said sockets, coöperating inclined bearing surfaces upon said clamping plates and box respectively, whereby said plates may be forced to the clamping position, one of said bearing surfaces having an inclined rib and the other of said bearing surfaces having a correspondingly inclined groove whereby friction between said surfaces will be reduced to a minimum.

8. In an outlet box having one or more conduit receiving bushings, an inclined surface on the base of said box adjacent each of said bushings, and clamping plates each having an inclined surface adapted to coöperate with the first named surface whereby said plates may be drawn to clamping position and a groove in one of said coöperating surfaces and a ridge in the other of said surfaces adapted to engage said groove whereby said plate will be guided to clamping position.

9. An outlet box having one or more integral conduit receiving bushings, conduit clamping plates arranged adjacent the entrance to said bushings and knock out disks for said bushings separate from said clamping plates, said disks having laterally extending lugs arranged to be held between said plates and the box to hold said disks in position over said bushings and adapted to be broken off in removing said disks.

WILLIAM A. BONNELL.

Witnesses:
R. C. POWELL,
CHAS. A. PEARD.